(12) United States Patent
Short

(10) Patent No.: US 7,310,415 B1
(45) Date of Patent: Dec. 18, 2007

(54) TRACKING AND NOTIFICATION OF TELEPHONE PLAN MINUTE STATUS

(75) Inventor: Shannon M. Short, Atlanta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 1051 days.

(21) Appl. No.: 09/943,109

(22) Filed: Aug. 30, 2001

(51) Int. Cl.
H04M 15/18 (2006.01)
(52) U.S. Cl. .................... 379/130; 455/405; 455/432.1
(58) Field of Classification Search ........... 379/114.28, 379/128, 130, 140, 131, 114.2; 455/405, 455/550, 406, 426.1, 432.1; 705/1, 400
See application file for complete search history.

(56) References Cited

U.S. PATENT DOCUMENTS

| | | | |
|---|---|---|---|
| 5,610,973 A | | 3/1997 | Comer |
| 6,058,305 A | * | 5/2000 | Chavez, Jr. .............. 455/426.1 |
| 6,094,644 A | * | 7/2000 | Hillson et al. .............. 705/400 |
| 6,198,915 B1 | * | 3/2001 | McGregor et al. .......... 455/406 |
| 6,289,314 B1 | * | 9/2001 | Matsuzaki et al. ............. 705/1 |
| 6,320,947 B1 | * | 11/2001 | Joyce et al. ............. 379/114.2 |
| 2002/0193092 A1 | * | 12/2002 | Bhogal et al. .............. 455/405 |

* cited by examiner

*Primary Examiner*—Gerald Gauthier
(74) *Attorney, Agent, or Firm*—Merchant & Gould

(57) ABSTRACT

A method and system for tracking telephone usage and notifying a user of his telephone usage includes a software program for tracking telephone usage based on the time and day that a phone call is made. The software program designates a timer for tracking phone usage. The timer has a time block and a time usage variable associated therewith. When a call is made, the time used by the call is recorded to the time usage variable if the call was made within the time block. The user may then be notified of how much time has been used. The software may be implemented in a number of environments, including a computer system accessible remotely or a processor located on the user's telephone.

22 Claims, 5 Drawing Sheets

|  | MONDAY | TUESDAY | WEDNESDAY | THURSDAY | FRIDAY | SATURDAY | SUNDAY |
|---|---|---|---|---|---|---|---|
| 7:00 AM | Day 71 | Day 71 | Day 71 | Day 71 | Day 71 | Weekend 75 | Weekend 75 |
| 12:00 PM | | | | | | | |
| 7:00 PM | Night 73 | Night 73 | Night 73 | Night 73 | Night 73 | | |
| 12:00 AM | | | | | | | |
| 6:59 AM | | | | | | | |

FIG. 3

TRACKING AND NOTIFICATION OF TELEPHONE PLAN MINUTE STATUS

FIELD OF THE INVENTION

The invention relates to methods and systems for tracking phone usage. More specifically, the invention relates to software for allowing a user to track his phone usage to determine the length of calls and the times at which calls are made.

BACKGROUND

Wireless telephone users are typically charged based on the time of day that a call is made and the length of the call. Typically, a price per minute, or rate, is set for a block of time during the day that is higher than the rate charged at night or on weekends. Rates charged at night or on weekends, commonly referred to as "off-peak" rates, are normally lower than daytime rates, or "peak" rates, due to the reduced demand for phone usage during nights and weekends.

Due in part to the reduced demand for off-peak calls, some calling plans offer unlimited calls during these times. A "calling plan" refers to a rate structure or cost structure used by telephone service providers for charging a customer for phone use. Many calling plans and their associated rate structures are imposed by a phone service provider and chosen by a user. A particular user's calling plan is typically defined in a contract between the phone service provider and the user. Phone service providers typically charge users a periodic fee, normally a monthly fee, under a calling plan for telephone service.

Telephone service providers typically charge users for units of time, or minutes, during which a call is made or received. Although for ease of presentation, the term "minute" is used herein to refer to a unit of time used for telephone network services, other units of time could be substituted. The term "minute" is also often used to refer to a credit of time which may be used by the user to make telephone calls. Telephone service providers also may offer "minutes" as time credits to users for purchase and use. Minutes useable during peak times are often referred to as "Daytime" minutes, while minutes useable during off-peak times are often referred to as "Night and Weekend" minutes. Some calling plans offer minutes which do not depend on the time at which they are used. These minutes are commonly referred to as "Anytime" minutes.

In one type of calling plan common in the wireless telephone industry, the user is allowed to make a set amount of calls during periods of times defined by the calling plan for which there is no additional charge above the user's monthly fee. Although this type of calling plan is more predominant in the wireless telephone setting, similar calling plan structures may be implemented in conventional wired networks or other networks. In such a calling plan structure, the amount of time included in the user's monthly fee is typically measured in discrete minute increments. In other words, if a user makes a call that lasts ten and one half minutes, eleven minutes are used from the calling plan. A calling plan may include a large number of minutes or even unlimited calls during off-peak times, but include a smaller number of minutes for peak calls. After the user has used his allocated minutes, he is typically charged a price per minute for additional calls.

Often the amount of minutes allocated for peak or off-peak times expires at the end of a billing cycle. A billing cycle is the period of time for which a user receives a bill. Billing cycles are typically monthly. In typical calling plans, if the plan includes 120 peak minutes per month, and the user only uses ten minutes of peak time, the user loses the remaining 110 minutes at the end of the month. At the beginning of each month, he will have exactly 120 peak minutes that he can only use during the billing cycle.

It is difficult in conventional systems for a user to track or monitor the user's phone usage to maximize the value of calling plans. If the user does not know how many minutes included in the calling plan remain, he might not make a call to avoid receiving additional charges. Sometimes users unintentionally exceed the minutes included in their calling plans. When users are surprised by the charges incurred from exceeding the usage included in the calling plan, customer dissatisfaction and irritation often results.

Conventional wireless telephones employ various methods for tracking time usage. These phones typically employ software for monitoring phone usage and displaying the information on a user display screen. Some phones track the total amount of time that a call takes and display this information to the user from a menu. Some phones divide time usage between incoming and outgoing calls such that users may view the time totals of calls made or calls received. Some phones record the length of the last call made. This information is recorded on a "timer," by which is meant a software construct for recording and tracking the length of calls. The timer, or more specifically, the information recorded by the timer, is viewed by the user on the wireless phone display.

In conventional systems, the information recorded by the timers does not relate to the typical calling plan structures and the limits imposed by the calling plans. Users may know the total number of minutes that the phone has been used, but not the time of day that the call is made. Total phone usage is irrelevant to many calling plan structures, which are based on the time that the calls were made. In conventional systems, the only way that users can accurately track the number or minutes used during peak or off-peak hours is to manually track the length of these calls. This requires the user to write down or record the length of every call with a note regarding the time of day that the call was made. Most users are unwilling or unable to track their usage with this amount of detail.

These and other problems are avoided and numerous advantages are provided by the system and method described herein.

SUMMARY OF THE INVENTION

The present invention provides a system and method for tracking telephone usage such that a user can determine the amount of time used within a time block designation. By "time block designation" or "time block" it is meant a period of time during the calendar day, week, or month. For example, a time block could consist of the time from 7:00 a.m. to 7:00 p.m. each day, excluding weekends. The user can then track how much time the telephone has been used during the time block, e.g., between 7:00 a.m. to 7:00 p.m. each day, excluding weekends. This information is very useful to most telephone calling plans, which are based on the time that a call is made. A typical calling plan allocates a finite number of minutes that can be used for calls between 7:00 a.m. and 7:00 p.m. each day, excluding weekends, after which a rate per minute is charged. Therefore, a user can tell how much time he has used, or conversely, how much time is left that the user is able to use before the rate is charged a per minute rate. The invention is applicable to a variety of applications, including computer networks and telephone network applications in wireless, "wired," and other systems.

In one aspect, the invention is directed to a method for tracking telephone plan minute status. A software program initializes a software construct referred to herein as a "timer" which has information, including a time block designation and time usage variable, associated therewith. The program adds the amount of time used by a call to the time usage variable only if the call was made within the time block associated with the timer. The program notifies the user of the predefined timer information. The predefined timer information includes the time usage variable, the time limit allocated by a calling plan during the relevant time block for which no additional charges are incurred, or the time limit minus the time usage variable.

In another aspect, the method includes initializing a plurality of timers, each having information, including a time block and time usage variable, associated therewith. This aspect of the invention allows a user to track the call time usage within more than one time block.

In yet another aspect, the method involves allowing a user to designate a time block. The time block may be set based on a block of time corresponding to the cost of calls.

In still another aspect, the method involves resetting the timer usage variable periodically. This aspect of the invention allows the timer usage variable to be reset for each billing cycle. Therefore, if calling plan minutes "expire" at the end of a billing cycle, the user can track the time usage based on the current billing cycle. Preferably, the user may be notified of the time usage or other timer information in a number of ways. An electronic message may be sent to the user, or the user could access the timer information by a computer network. The user could request timer information through a voice mail service. More preferably, the timer information is protected by a user password.

In still another aspect, the invention relates to a system for tracking telephone plan minute status. The system includes a computer and a software program loaded onto the computer. The software program is configured to implement the method described above.

In yet another aspect, a system for tracking telephone plan minute status includes a telephone, and a software program loaded onto the telephone. The software program is configured to implement the method described above.

The invention allows a user to track his phone usage based on the amount of call usage time used during designated blocks of time. The blocks of time may be set either by the user or remotely to correspond to rates in telephone plans. In this way, a user can see how much phone use time is used in each time block, i.e., how many peak or off-peak minutes are used in a billing cycle and how many are left before a per minute rate is charged. Therefore, users will know when they are being charged a per minute rate, which will result in increased consumer satisfaction. Furthermore, a fee may be charged to access the timer information, increasing revenues to telephone service providers.

These and other advantages will become apparent to those of ordinary skill in the art with reference to the detailed description and drawings.

BRIEF DESCRIPTION OF THE DRAWINGS

FIG. 3 is a chart demonstrating the time blocks defined by an exemplary calling plan.

DETAILED DESCRIPTION OF THE INVENTION

According to an embodiment of the present invention, a system tracks the total time that a telephone is used during a specific time block. A user can track how much time the telephone has been used during the time block, which is very useful to most telephone calling plans. Telephone calling plans are based on the time that a call is made, and typically allocate a finite number of minutes that can be used during a time block, after which a rate per minute is charged. Therefore, a user can tell how much time he has used, or conversely, how much time is left that the user is able to use, before the user is charged a per minute rate. The invention is applicable to a variety of applications, including computer networks and telephone network applications in wireless, "wired," and other systems for communication between electrical devices.

Figure 1:
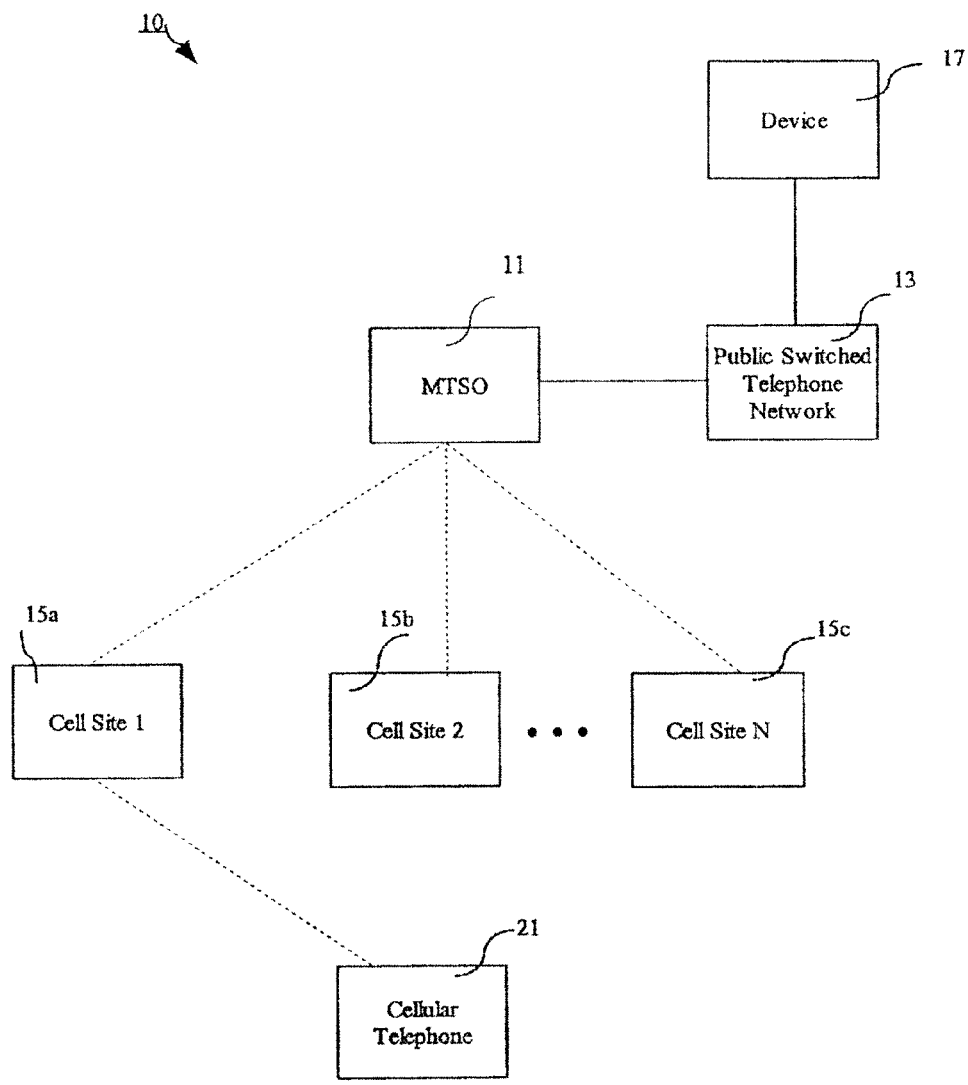
FIG. 1 is a block diagram of an exemplary wireless phone network.

FIG. 1 is a block diagram of an exemplary wireless phone network. An overview of wireless phone networks is provided in more detail by U.S. Pat. No. 5,850,606 to Bedingfield et al., which is hereby incorporated by reference.

For clarity and ease of presentation, an example of a wireless phone network has been depicted in FIG. 1. As will be readily appreciated by those of ordinary skill in the art, the invention is applicable to wireless as well as wired telephone networks, and other types of communication networks. For example, the invention is easily modified for use in a computer network. Any number of network configurations may be used to implement the system and method disclosed herein. It is not necessary that a particular wireless or wired telephone network configuration is used.

In the network 10 depicted in FIG. 1, a mobile wireless telephone 21 communicates with other telephones and compatible electronic equipment through one or more mobile telephone switching offices ("MTSO") 11 and wireless sites 15a-15n. The MTSO 11 establishes voice or other communications such as text communications with other telephones and compatible electronic equipment within the coverage area. As is known to those skilled in the art, the wireless telephone 21 passes through various cell sites 15a-15n under the control of the MTSO 11 based on the geographic movement of the wireless phone user. Each cell site 15a-15n contains a transmitter and a receiver for communicating voice and data signals directly to and from the MTSO 11 and the wireless telephone 21 while the wireless telephone 21 is within the transmission range of a particular cell site 15a. As the wireless telephone 21 is moved outside the range of cell site 15a, it is transferred to a second cell site such as cell site 15b. The MTSO 11 controls the wireless telephone 21 as it passes through the various cell sites 15a-15n.

The MTSO 11 controls a number of cell sites and has a geographic range for tracking and monitoring wireless telephones. When the wireless telephone 21 moves outside the range of the MTSO 11, a second MTSO 23, which has control over another number of cell sites, 25a-n, controls communication with the wireless telephone 21.

The MTSO 11 depicted in the network 10 is connected to a public switched telephone network 13. A device 17 is connected to the public switched telephone network 13. Both the connection between the MTSO 11 and the public switched telephone network 13 may be wired connections or wireless connections. The device 17 can be a wireless mobile phone, or a wired telephone, or any device compatible with the telephone network such as personal computers (PC's) or other electronic devices.

Figure 2:
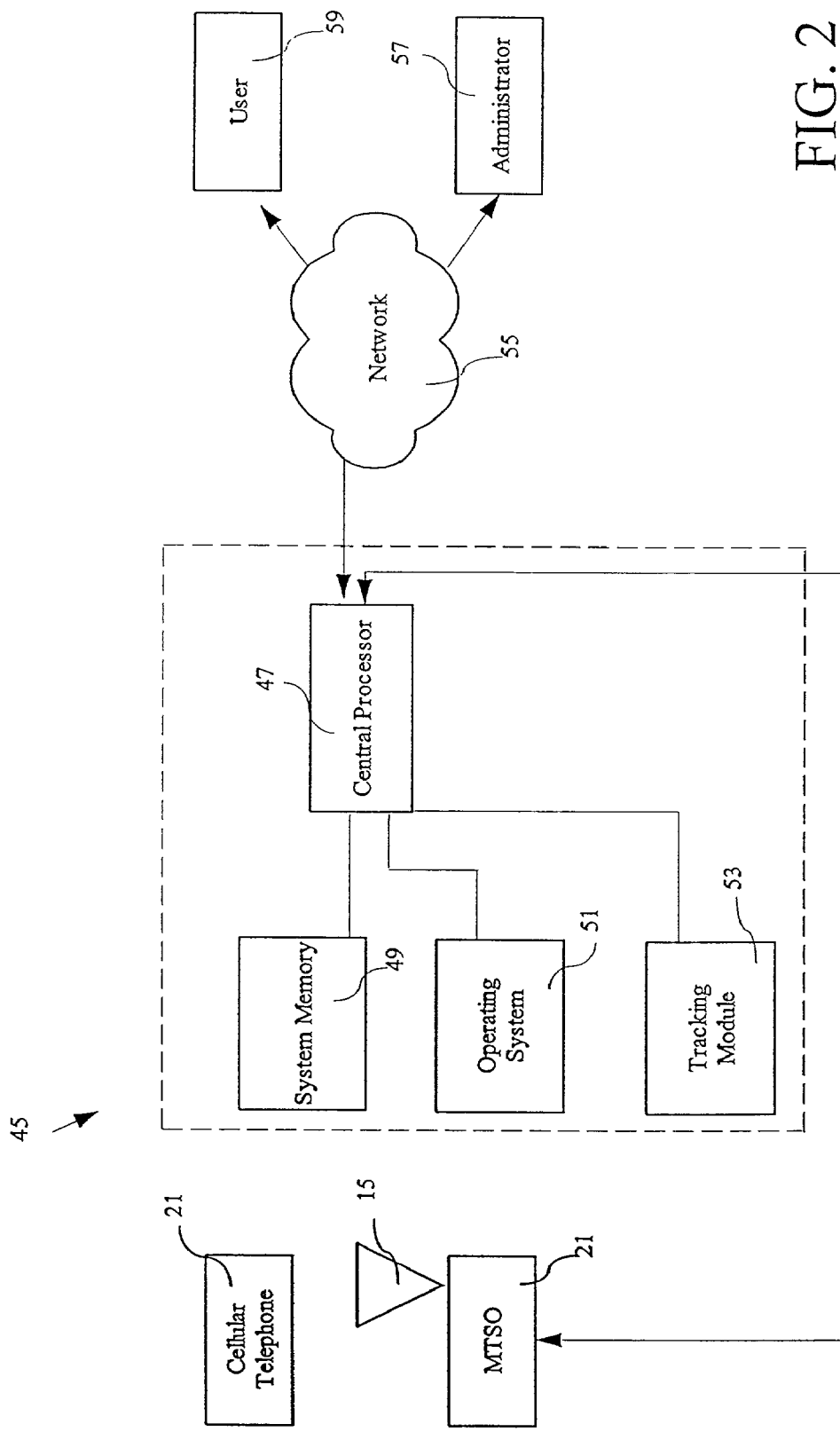
FIG. 2 is a block diagram of an exemplary computer system and phone network for implementing an embodiment of the invention.

FIG. 2 is a block diagram which depicts an embodiment of a system according to the present invention. The exemplary system shown in FIG. 2 has an MTSO 11 that is in communication with a wireless telephone 21 and a wireless site 15. The wireless telephone 21, MTSO 11 and wireless site 15 may be part of a network of other MTSOs, wireless telephones, and wireless sites, such as the network shown in greater detail in FIG. 1.

The MTSO 11 is in communication with a computer system 45 through a central processor 47 that resides on the computer system 45. The computer system 45 has system memory 49 for storing data. An operating system 51 is loaded onto the computer system 45 for running and controlling application software. The tracking module 53 is an example of an application that is run by the operating system 51. The tracking module 53 is described in greater detail below.

The central processor 47 of the computer system 45 is in communication with a computer network 55. The computer network 55 may be the global computer network, or Internet. The computer network 55 allows communication between the computer system 45 and other computer systems or terminals that may be connected to the computer network 55. Examples of terminals that may be connected to the computer network 55 include the user terminal 59 and the administrator terminal 57. The user terminal 59 allows a user to access information on the computer system 45 through the network 55, and the administrator terminal 57 likewise allows an administrator to access information. The administrator terminal 57 may have access to information for many or even all users, while a user terminal 59 would typically only be able to access the information pertaining to one user.

The system depicted in FIG. 2 allows data such as call information, voice transmissions, and text messages, from the wireless telephone 21 to be transmitted from the wireless site 15 and an MTSO 11 to a computer system 45. The data is stored in the system memory 49, and/or processed by the tracking module 53, which is run and controlled by the operating system 51. The central processor 47 communicates the data or other information derived from the data to a computer network 55, where it may be accessed at a user terminal 59 or an administrator terminal 57. Thus, a user or administrator can track the usage of the wireless telephone 21 from the user terminal 59 or administrator terminal 57, respectively.

FIG. 3 is a graphical depiction of a wireless telephone calling plan schedule which is divided into time blocks. Although the calling plan schedule depicted in FIG. 3 is common to wireless telephone calling plans, similar calling plans are used to charge for conventional, in-home wired telephone service. The time blocks include day time blocks 71 (7:00 a.m. to 7:00 p.m., weekdays), night time blocks 73 (7:00 p.m. to 6:59 a.m., weekdays), and weekend time blocks 75. Each time block 71, 73, or 75 corresponds to a minute classification, such as "night," "day" or "weekend" time blocks.

A typical telephone calling plan allows a set number of minutes in each time block 71, 73, or 75. The night time block 73 and the weekend time block 75 are typically considered off-peak calling times. Calling plans typically include a given number of calling minutes per month for a monthly fee based on the time block 71, 73, or 75. Some calling plans allow unlimited or large amounts of calling minutes during the night and weekend time blocks 73 and 75. A more limited number of calling minutes are typically associated with the day time block 71. For example, a user might be able to make unlimited calls during the night and weekend time blocks 73 and 75, but be able to make only 60 minutes of calls during the day time blocks 71. If more than 60 minutes of calls are made during the day time block 71, a user is charged an additional rate per minute. The time blocks 71, 73, and 75 are examples of time blocks typically used by wireless telephone service providers to charge users. However, any number or size of time block may be used. For example, some telephone calling plans divide the time period between 7:00 p.m. and 7:00 a.m. into a plurality of time blocks. While many telephone plans are divided into two or three time blocks, four or more time blocks are feasible.

It is desirable for a user who is charged based on time blocks 71, 73 and 75 to be able to keep track of the amount of time used in each time block 71, 73, and 75.

Referring again to FIG. 2, data such as call information, voice transmissions, and text messages, from the wireless telephone 21 is transmitted from the wireless site 15 and an MTSO 11 to a computer system 45. The data is stored in the system memory 49, and/or processed by the tracking module 53, which is run and controlled by the operating system 51. The central processor 47 communicates the data or other information derived from the data to a computer network 55, where it may be accessed at a user terminal 59 or an administrator terminal 57. Thus, a user or administrator can track the usage of the wireless telephone 21 from the user terminal 59 or administrator terminal 57, respectively.

The information from the wireless telephone 21 that is transmitted to the computer system 45 includes the length of calls and the times that calls are made. This information can then be tracked by tracking module 53, described in greater detail below, in the computer system 45 and communicated to the user at the user terminal 59.

The network system depicted in FIG. 2 is an example of a system in which a tracking module according to the present invention may be operated. As would be understood by one of ordinary skill in the art, alternative networks may be implemented. In an alternative embodiment, the computer system 45 and the user terminal 59 could be a single computer which receives and processes the data (using the tracking module 53) from the wireless telephone 21 directly. In another embodiment, a telephone network is substituted for the computer network 55 and a telephone is substituted for the user terminal 59. The user dials a telephone number which connects the user to a voice mail system through a telephone network. Information from the computer system 45 is communicated to the user through the voice mail system, which may be a conventional voice mail service. In yet another embodiment, the wireless telephone 21 contains a processor chip which runs the tracking module 53 on the telephone. In this embodiment, the wireless telephone 21 has a display through which the user can access information about calling usage processed by the tracking module 53. Thus, the computer network 55, computer system 45 and user and administrator terminals 59 and 57 are eliminated. In another embodiment, a conventional wired telephone replaces the wireless telephone 21. The wired telephone may be connected to a computer system such as computer system 45 and computer network 55 with user and administrative terminals 59 and 57. In yet another embodiment, a conventional wired telephone contains a processor chip which runs the tracking module 53 on the telephone. In this embodiment, the telephone has a display through which the user can access information about calling usage processed by the tracking module 53.

The tracking module 53 is a computer program for tracking telephone usage. The flow of the tracking module computer program and various features thereof is depicted in FIGS. 4 and 5.

The tracking module designates a timer. The "timer" is a software construct for storing information. The information associated with the timer includes a timer block. Examples of timer blocks are discussed herein and depicted in FIG. 3. The information associated with the timer also includes a time usage variable. The time usage variable is another software construct for tracking time usage.

By the terms "program," "routine" "program routine" or "module" is meant any block of software code that may be logically grouped together that may or may not use the conventional subroutine interfaces as defined by typical programming languages. A program routine is generally understood as a stylistic convention of programming, and thus different routines or subroutines may be written in multiple combinations and accomplish the same function. Thus, as used herein, a program routine encompasses any block of code logically grouped together regardless of whether conventional subroutine interfaces as defined by typical programming languages are used. By the term "variable" is meant any software construct for storing information which can be manipulated by a program routine.

Figure 4:
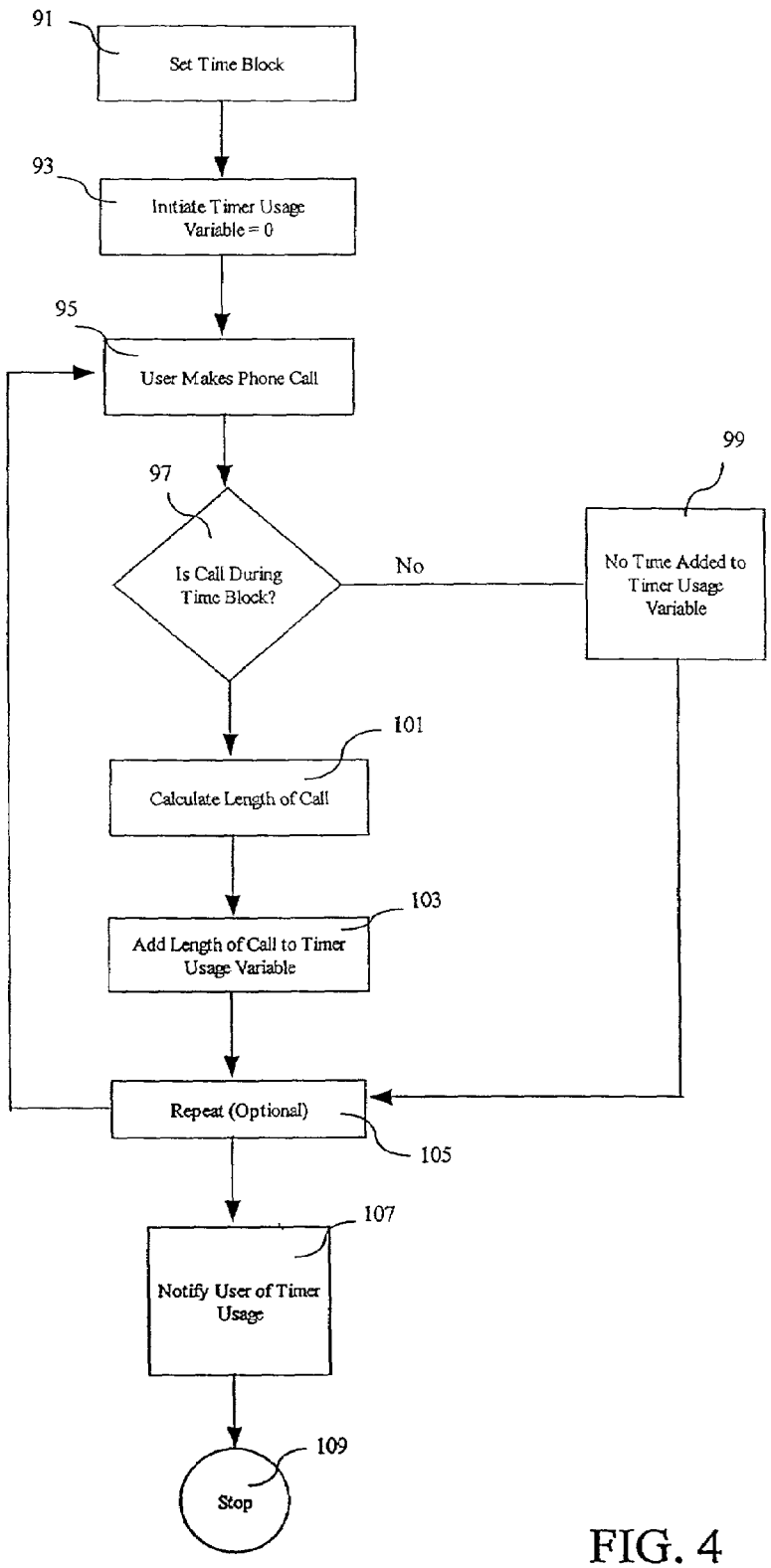
FIG. 4 is the flow of a method according to the present invention.
Figure 5:
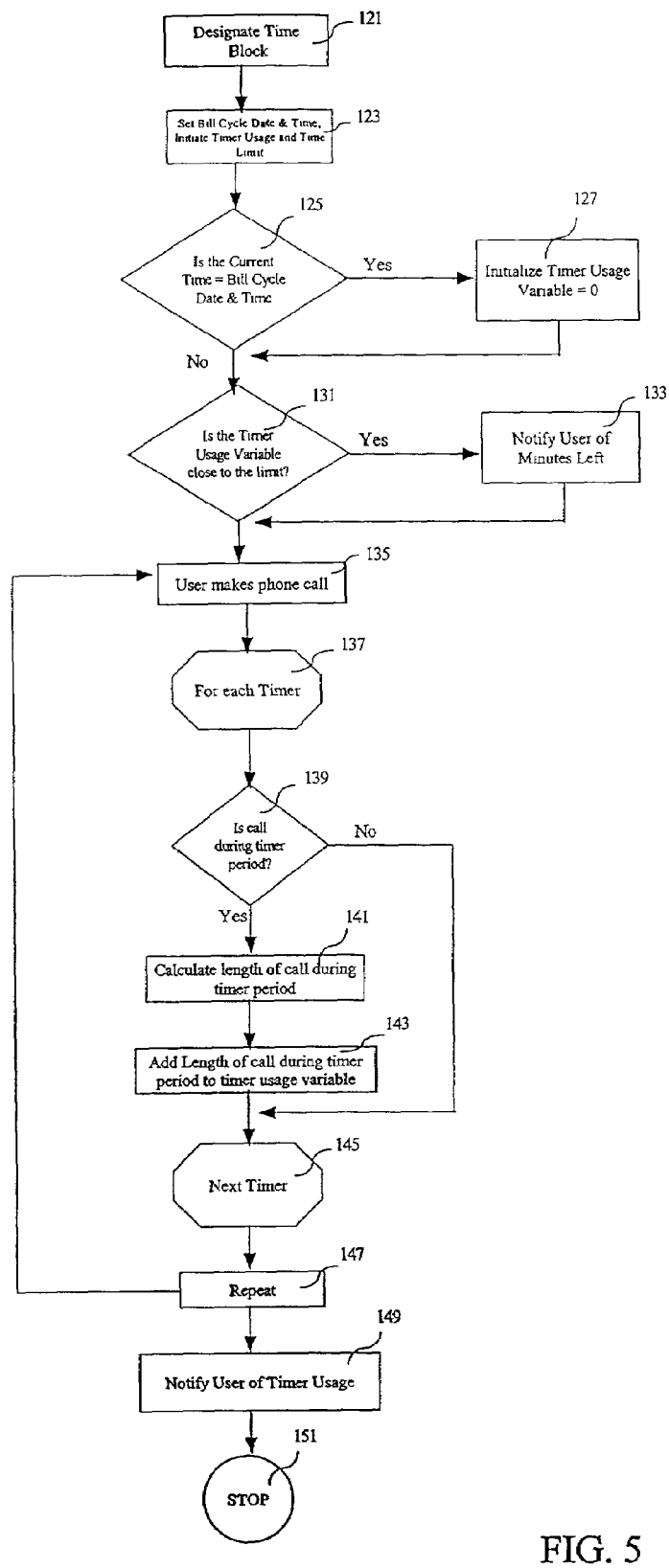
FIG. 5 is an alternative embodiment of the flow of the method according to the present invention.

Referring to FIG. 4, the tracking module initializes a timer. A timer is a software construct for storing and manipulating information. A timer has various timer information associated therewith, such as time block information, a time usage variable, and the amount of time that a user may use "free" telephone time without incurring an additional charge. The time block information, time usage variable, and "free" time associated with the timer are examples of information that may define the timer. The timer information may be initialized and manipulated using conventional software programming techniques The tracking module designates a timer time block at step 91 by initializing information defining the time block using conventional programming techniques. As shown in the example depicted in FIG. 3, a time block is a block of time associated with a day of the week and time of day. In one embodiment, the time block is set, or initialized to a specific value, by a user through a user interface that may be located on the user's wireless or wired telephone. The user is prompted by a software program to enter values for the time block, e.g., beginning and ending times or beginning and ending dates and times. In another embodiment, the time block is set remotely by an administrator. The administrator or user sets the time block by initializing its values using conventional software programming techniques. For example, the administrator or user may be prompted by a software program from a user interface to enter values for the time block, e.g., beginning and ending times or beginning and ending dates and times. These values are input values into the tracking module, and include the beginning and ending times or beginning and ending dates and times for the time block. The administrator or user may also be prompted to input the number of minutes for which the user does not receive an additional charge with respect to each time block. It is advantageous for the time block to correspond to a calling rate or a block of time to which a predefined number of "free" minutes are included pursuant to the user's calling plan.

The timer usage variable is initialized in step 93. The timer usage variable starts at zero before any telephone time has been used.

At step 95, the user makes a telephone call. The telephone call start time and end time is recorded as an input to the tracking module. At step 97, the tracking module queries whether the call was made during the time block associated with the timer. If the call was not made during the time block, then the tracking module does not add time to the timer usage variable at step 99. At step 105, the user optionally repeats a phone call to step 95.

Returning to step 97, if the call was made during the time block, the tracking module calculates the length of the call at step 101. The length of the call can be determined by calculating the difference between the start time and the end time of the call. The length of the call may be rounded up to the next minute increment because calling plans usually charge a discrete unit minute for each fraction of a minute. At step 103, the length of the call is added to the timer usage variable. Phone calls may be repeated from step 105.

At step 107, the tracking module notifies the user of total timer usage, and the tracking module ends the program at step 109. The total timer usage is the value of the timer usage variable, which is equal to the length of all calls during the time block. Therefore, the user knows how much calling time has been used in a specific time block. The user may access this information from the user terminal 59. In an alternative embodiment, the user accesses the timer information from a display on the user's telephone. In still another embodiment, the timer information is accessed from a voice mail system. In yet another embodiment, the user is notified of timer usage in step 107 after any of steps 91, 93, 95, 97, 99, 101, 103, or 105 and the flow continues to the next consecutive step. Thus, the user is allowed to access timer information at any time.

FIG. 5 shows the flow of an alternative embodiment of the invention illustrating various features. The tracking module designates a timer which includes a timer time block, examples of which are depicted in FIG. 3. The timer also has a time usage variable associated therewith. The embodiment illustrated in FIG. 4 includes multiple timers for tracking the time used in a plurality of time blocks.

The timer time block is designated at step 121. The time block may be set by a user or it may be set remotely by an administrator. The administrator or user sets the time block by initializing its values using conventional software programming techniques. For example, the administrator or user may be prompted by a software program from a user interface to enter values for the time block, e.g., beginning and ending times or beginning and ending dates and times. These values are input values into the tracking module, and include the beginning and ending times or beginning and ending dates and times for the time block. The time block preferably corresponds to a block of time associated with a billing rate or a block of time for which a set amount of "free" minutes are included in the user's calling plan.

At step 123, a billing cycle date and time, a timer usage variable, and the time limits are set. By "time limit" it is meant the amount of calling time during the time block that a user may use according to his calling plan without incurring additional per minute charges. The billing cycle date and time, the timer usage variable, and the time limits may be set remotely by an administrator or by the user. The timer usage variable is set to zero before any calls are made on the telephone. The billing cycle date and time is the date and time at which a new billing cycle begins. Typically, if the user has not used minutes included in the calling plan by the billing cycle date and time, the minutes expire. Therefore, at the beginning of each billing cycle, the user has only the number of minutes included in the calling plan available for usage. The number of minutes is normally the same every month. On the other hand, if the calling plan allows minutes to "roll over" each month, i.e., the minutes do not expire, the time limit for the next month is increased by the number of minutes that roll over from the previous month.

At step 125, the tracking module checks a current time value to see if it is equal to the billing cycle date and time. As would be understood by those skilled in the art, a computer processor may have an internal clock for tracking the current time value. By "time value" is meant a calendar date and time. If the tracking module determines that it is the beginning of a billing cycle because the current time value is the same as the billing time and date, the time usage variable is initialized to zero. Steps 125 and 127 ensure that the timer value is reset to zero at the beginning of each billing cycle because the user's available minutes on his calling plan will be initialized at this time to the values set by the plan.

The tracking module checks at step 131 to see if the time usage variable is close to the time limit set by the calling plan. Thus, if the time usage variable indicates that the time limit imposed by the calling plan is about to be reached at step 131, the user is notified of the number of minutes left at step 133. The difference between the timer usage variable and the time limit which triggers a "yes" response at step 131 may be set by a user or by an administrator. In one embodiment, the user is notified at step 133 by an instant message either to an email account or to a wireless telephone. In another embodiment, the telephone makes a noise to indicate that the time limit is about to be reached.

At step 135, the user makes a telephone call. For each timer at step 137, the tracking module queries whether the call is during the time block associated with the particular timer at step 139. The flow of steps 139, 141, and 143 are repeated for the next timer at step 145.

If the call is made during the time block associated with a particular timer at step 139, the tracking module calculates the length of the call that is during the time block. Step 139 calculates only the length of the call that is during the time block. Some calls may overlap between two or more time blocks. Step 139 ensures that only the amount of the call within the time block is added to the time usage variable at step 143. The flow of steps 139, 141, and 143 are repeated for the next timer at step 145.

At step 147, the user optionally causes steps 135, 137, 139, 141, 143, and 145 to repeat by making another telephone call. At step 149, the user is notified of the total timer usage. The total timer usage is the value of the timer usage variable, which is equal to the length of all calls during the time block. Therefore, the user knows how much calling time has been used in a specific time block associated with the timer. The user may access this information from the user terminal 59. In another embodiment, the user is notified of all timer information. In yet another embodiment, the user requests the timer information for one or more timers. In an alternative embodiment, the user accesses the timer information from a display on the user's telephone. In still another embodiment, the timer information is accessed from a voice mail system. In yet another embodiment, the user is notified of timer usage in step 107 after any of steps 91, 93, 95, 97, 99, 101, 103, or 105 and continues to the next consecutive step. Thus, the user is allowed to access timer information at any time.

EXAMPLE 1

The invention will be further illustrated by the following example.

A calling plan defines calling rates according to the time blocks shown in FIG. 3. The time blocks include day time blocks 71 (7:00 a.m. to 7:00 p.m., weekdays), night time blocks 73 (7:00 p.m. to 6:59 a.m., weekdays), and weekend time blocks 75 Each time block 71, 73, or 75 corresponds to a minute classification, such as "night," "day" or "weekend" time blocks. In exchange for paying a telephone service provider $30 per month, the telephone service provider provides 120 minutes of telephone use to the user per month without any additional charge if the calls are made during night time blocks 73 and weekend time blocks 75. Calls made during the day time blocks 71 or after the 120 minutes of "free" night and weekend time is used incur a fee of $0.30 per minute.

Referring to FIG. 4, the user sets a time block at step 91 associated with a timer. The user's telephone 21 shown in FIG. 2 includes a processor chip which runs a software program. The user's telephone 21 has a user interface, which prompts the user to set time blocks by inputting the start and end times and dates of the time block. Because the user has a limited amount of night time and weekend calls, the user designates or sets the time block values according to the start and stop times of weekend time blocks 75 (7:00 a.m. to 7:00 a.m., weekends) and night time blocks 73 (7:00 p.m. to 6:59 a.m., weekdays). The time block information is communicated to the tracking module 53 through the wireless site 15 and the MTSO 11 as shown in FIG. 2.

Referring again to FIG. 3, the timer usage variable is initialized to zero at step 93. Because no calls have been made, the timer usage variable is zero.

The user makes a telephone call at 9:00 p.m. that lasts until 9:30 p.m. at step 95. The tracking module detects that the call is made during the time block at step 97. The tracking module calculates the length of the call to be 30 minutes at step 101. The tracking module adds the length of the call to the appropriate timer usage variable at step 103 such that the timer usage variable has a value of 30 minutes.

At step 107, the user is notified of the timer usage variable value. The user telephone 21 in FIG. 2 has a user interface which has a menu for choosing which information the user would like to view. If the user chooses to view the timer information from the menu, the user will see that it has used 30 minutes of night time and weekend calls.

EXAMPLE 2

The invention will be further illustrated by the following example.

A calling plan defines calling rates according to the time blocks shown in FIG. 3. The time blocks include day time blocks 71 (7:00 a.m. to 7:00 p.m., weekdays), night time blocks 73 (7:00 p.m. to 6:59 a.m., weekdays), and weekend time blocks 75 Each time block 71, 73, or 75 corresponds to a minute classification, such as "night," "day" or "weekend" time blocks. In exchange for paying a telephone service provider $50 per month, the telephone service provider provides unlimited minutes of telephone use to the user per month without any additional charge if the calls are made during night time blocks 73 and weekend time blocks 75. In addition, the telephone service provider provides 120 minutes of calls if the calls made during the day time blocks 71. If the user uses all 120 minutes of calls allowed during the day time blocks 71, the telephone service provider charges the user a fee of $0.30 per minute.

Referring to FIG. 4, the user sets a time block at step 91 associated with a timer. The user terminal 59 shown in FIG. 2 includes a processor chip which runs a software program. The user terminal 59 has a user interface, which prompts the user to set time blocks by inputting the start and end times of the time block. Because the user has a limited amount of daytime calls, the user designates or sets the time block values according to the start and stop times of day time blocks 71 (7:00 a.m. to 7:00 p.m., weekdays). The time block information is communicated to the tracking module 53 through the computer network 55 and the central processor 47 as shown in FIG. 2.

Referring again to FIG. 3, the timer usage variable is initialized to zero at step 93. Because no calls have been made, the timer usage variable is zero.

The user makes a telephone call at 9:00 p.m. that lasts until 11:30 p.m. at step 95. The tracking module detects that the call is made during the time block at step 97. The tracking module calculates the length of the call to be 150 minutes at step 101. The tracking module adds the length of the call to the timer usage variable at step 103 such that the timer usage variable has a value of 150 minutes.

At step 107, the user is notified of the timer usage variable value. The user terminal 59 in FIG. 2 has a user interface which has a menu for choosing which information the user would like to view. If the user chooses to view the timer information from the menu, the user will see that the user has used 150 minutes of nighttime and weekend calls.

It will be apparent to those with skill in the art that there are many alterations that may be made in the embodiments of the invention described above without departing from the spirit and scope of the invention. For example, there are many ways that circuits and electronic elements may be combined to implement the system and method described herein in various systems and hardware environments. There are similarly many ways that independent programmers might provide software to provide the functionality associated with the present invention as taught herein without departing from the spirit and scope of the invention.

Having thus generally described the invention, the same will become better understood from the following claims in which it is set forth in a non-limiting manner.

That which is claimed:

1. A method for tracking telephone plan minute status, comprising:
    initializing a first timer, having timer information, including a time block designation having time limits and a timer usage variable, associated therewith, wherein the time block designation comprises a predetermined period of time comprising a portion of a twenty-four hour period for which the telephone plan provides a finite number of minutes for making calls during a recurring period, the recurring period comprising at least one of the following: a calendar day, a calendar week, and a calendar month;
    adding time used by a call to the timer usage variable when the call was made within the time block designation associated with the first timer; and
    notifying a user of predefined timer information wherein the predefined timer information includes the time limits minus a value of the timer usage variable.

2. The method of claim 1, further comprising:
    initializing a second timer, having timer information, including a second time block designation and a second timer usage variable, associated therewith wherein the first timer usage variable and the second timer usage variable can accumulate time simultaneously.

3. The method of claim 1, wherein the predefined timer information includes the value associated with the timer usage variable.

4. The method of claim 1, further comprising:
    receiving from the user time block information to initialize a timer.

5. The method of claim 2, further comprising:
    setting each time block designation associated with each timer based on a time block defined by a calling plan structure.

6. The method of claim 2, wherein each time block designation associated with each timer comprises at least one beginning time and at least one ending time.

7. The method of claim 2, wherein each time block designation associated with each timer comprises at least one beginning date and at least one beginning time and at least one ending date and at least one ending time.

8. The method of claim 1, further comprising:
    resetting the timer usage variable.

9. The method of claim 8, further comprising:
    resetting the timer usage variable periodically.

10. The method of claim 1, wherein said notifying further comprises:
    sending an electronic message to the user.

11. The method of claim 1, wherein said notifying further comprises:
    transmitting timer information on a computer network to the user.

12. The method of claim 1, wherein said notifying further comprises:
    receiving a user request for timer information through a voice mail system; and
    transmitting timer information to the user through the voice mail system.

13. The method of claim 1, further comprising:
    protecting the predefined timer information with a user password.

14. The method of claim 1, further comprising:
    charging a fee to access the predefined timer information.

15. A computer-implemented system for tracking telephone plan minute status, comprising:
    means for initiating a timer, wherein the timer has information, including a time block designation having a time limit and a timer usage variable, associated therewith, wherein the time block designation comprises a predetermined period of time comprising a portion of a twenty-four hour period for which the telephone plan provides a finite number of minutes for making calls during a recurring period, the recurring period comprising at least one of the following: a calendar day, a calendar week, and a calendar month;
    means for adding time used by a call to the timer usage variable when the call was made within the time block designation associated with the timer; and
    means for notifying a user of predefined timer information wherein the predefined timer information includes the time limit minus a value of the timer usage variable.

16. The system of claim 15, wherein the predefined timer information includes the value of the timer usage variable.

17. The system of claim 15, further comprising means for resetting the timer usage variable periodically.

18. The system of claim 15, further comprising means for protecting information associated with the timer with a password.

19. The system of claim 15, further comprising:
- a computer network in communication with the computer and configured for allowing the user to access the predefined timer information.

20. A computer readable medium having stored thereon computer-executable instructions for causing a computer to perform a method for tracking telephone plan minute status, the method comprising:
- initializing a first timer, having timer information, including a time block designation having time limits and a timer usage variable, associated therewith, wherein the time block designation comprises a predetermined period of time comprising a portion of a twenty-four hour period for which the telephone plan provides a finite number of minutes for making calls during a recurring period, the recurring period comprising at least one of the following: a calendar day, a calendar week, and a calendar month;
- adding time used by a call to the timer usage variable when the call was made within the time block designation associated with the first timer; and
- notifying a user of predefined timer information wherein the predefined timer information includes the time limits minus a value of the timer usage variable.

21. The computer readable medium of claim 20, wherein the method further comprises initializing a second timer, having timer information, including a second time block designation and a second timer usage variable, associated therewith wherein the first timer usage variable and the second timer usage variable are enabled to accumulate time simultaneously.

22. A method for tracking telephone plan minute status, comprising:
- initializing a first timer, having timer information, including a user-defined time block designation having time limits and a timer usage variable, associated therewith, the time limits comprising time values entered by a user in a user interface, the time values comprising beginning and ending times for the time block;
- adding time used by a call to the timer usage variable when the call was made within the time block designation associated with the first timer; and
- notifying a user of predefined timer information wherein the predefined timer information includes the time limits minus a value of the timer usage variable.

\* \* \* \* \*